United States Patent [19]

Schön

[11] Patent Number: 4,527,341
[45] Date of Patent: Jul. 9, 1985

[54] ANGLE DETERMINATOR OF PARALLELOGRAM TYPE

[76] Inventor: Lennart Schön, 12 Posthemsvägen, S-575 00 Eksjö, Sweden

[21] Appl. No.: 656,874

[22] Filed: Oct. 2, 1984

[30] Foreign Application Priority Data

Oct. 6, 1983 [SE] Sweden ............................... 8305505

[51] Int. Cl.³ ............................................. B43L 7/06
[52] U.S. Cl. .................................... 33/455; 33/25 R; 33/461
[58] Field of Search .................. 33/23 R, 25 R, 25 B, 33/25 C, 455–457, 459–463

[56] References Cited

U.S. PATENT DOCUMENTS

| 451,810 | 5/1891 | Cowgill | 33/455 |
| 541,514 | 6/1895 | Walker | 33/455 |
| 742,528 | 10/1903 | Traut | 33/455 |
| 797,453 | 8/1905 | Nagel | 33/455 |
| 925,807 | 6/1909 | Green | 33/455 |
| 956,356 | 4/1910 | Humbert | 33/455 |

*Primary Examiner*—Robert S. Ward
*Attorney, Agent, or Firm*—Hubbell, Cohen, Stiefel & Gross

[57] ABSTRACT

An angle determinator comprises four hingedly interconnected links. These links form jointly a parallelogram having its apexes constructed as pivot joints. At one of the apexes of the parallelogram the links are rotatably connected to a bar which is provided with a scale. Along this scale that apex of the parallelogram which is opposite to said one apex is displaceable together with a pointer cooperating with said scale. To make possible quick and handy determination not only of such "concave" or "open" angles as are defined by two planes, e.g. a floor and a wall or a wall and a ceiling, but also of "convex" or "solid" angles, i.e. angles in which only the outside of the planes defining the angle is accessible to the angle determinator, one of the links of the angle determinator forming the angle of the parallelogram at said opposite apex constitutes an integral portion of a substantially straight rod which together with said bar forms an angle which is half as wide as the angle of the parallelogram at said first apex.

4 Claims, 4 Drawing Figures

ANGLE DETERMINATOR OF PARALLELOGRAM TYPE

BACKGROUND OF THE INVENTION

This invention relates to an angle determinator, comprising four hingedly interconnected links jointly forming a parallelogram which at one of its apexes, which are constructed as pivot joints, is turnably connected to a bar or the like which is provided with at least one scale and along which that apex of the parallelogram, which is opposite to said one apex, is displaceable together with a pointer or the like cooperating with said scale.

SUMMARY OF THE INVENTION

The principal object of the invention is to provide a simple angle determinator which is easy to operate and by means of which one handily and quickly can determine not only such "open" or "concave" angles as are enclosed or defined by two planes, e.g. a wall and a floor, or a ceiling and a wall but also "convex" or "solid" angles, i.e. angles in which only the outside of the planes defining the angle is accessible to the angle determinator. An example of such a convex angle is the angle between two walls of a room, one of said walls being shorter than the width of the room and the other wall defining a corridor-like portion of the room, the sum of the width of the corridor portion and the length of said one wall being (approximately) equal to the width of the room.

This object is attained thanks to the fact that one of the links of the angle determinator forming the angle of the parallelogram at said opposite apex constitutes an integral portion of a substantially straight rod or the like which together with said bar forms an angle which is half as wide as the angle of the parallelogram at said first apex.

BRIEF DESCRIPTION OF THE DRAWINGS

Further features and advantages of the angle determinator according to the invention will become apparent from the following detailed description and the annexed drawings.

BRIEF DESCRIPTION OF THE PREFERRED EMBODIMENTS

Figure 1:
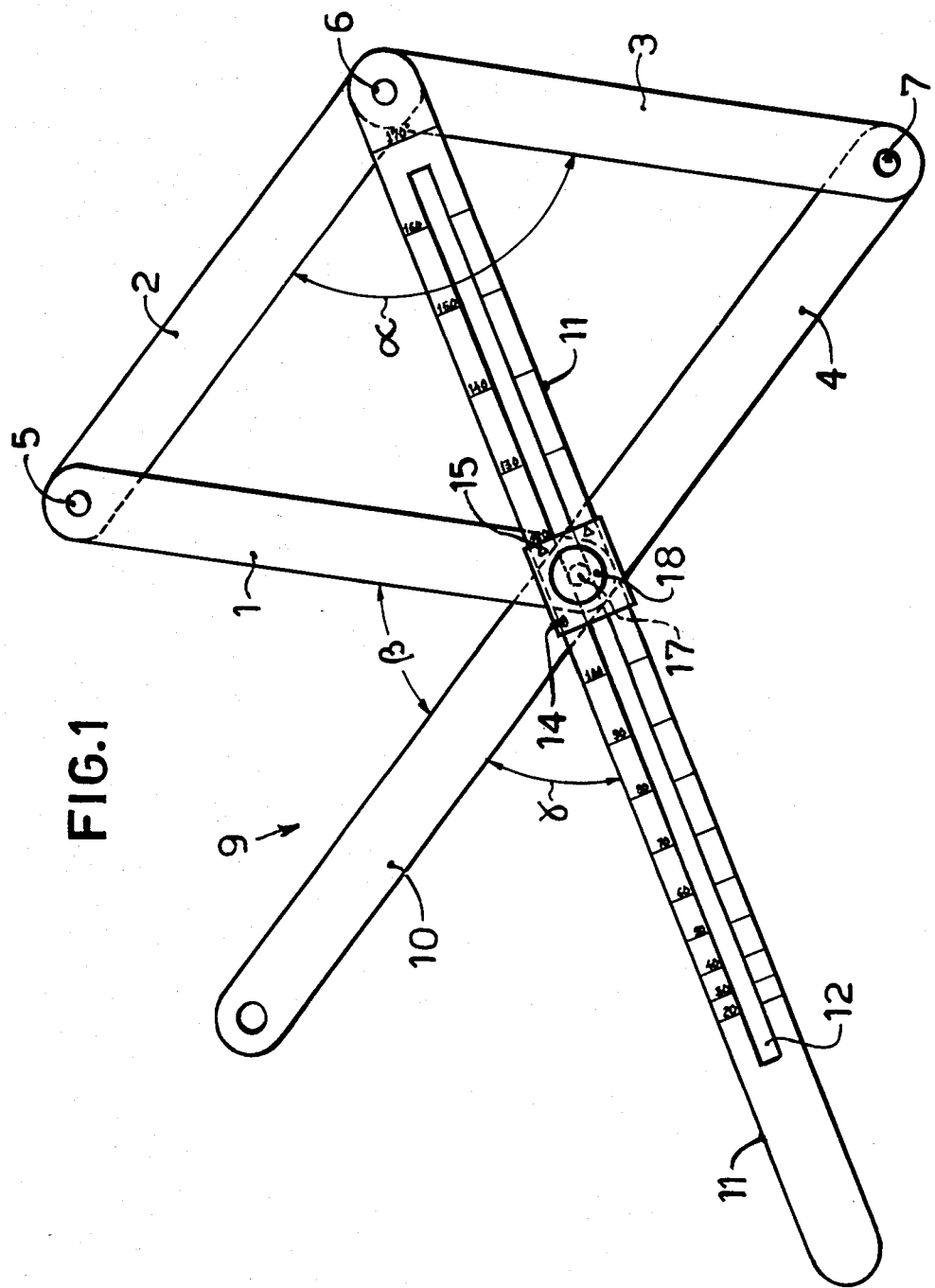
FIG. 1 is a plan view illustrating a preferred embodiment of the angle determinator in a first position.
Figure 2:
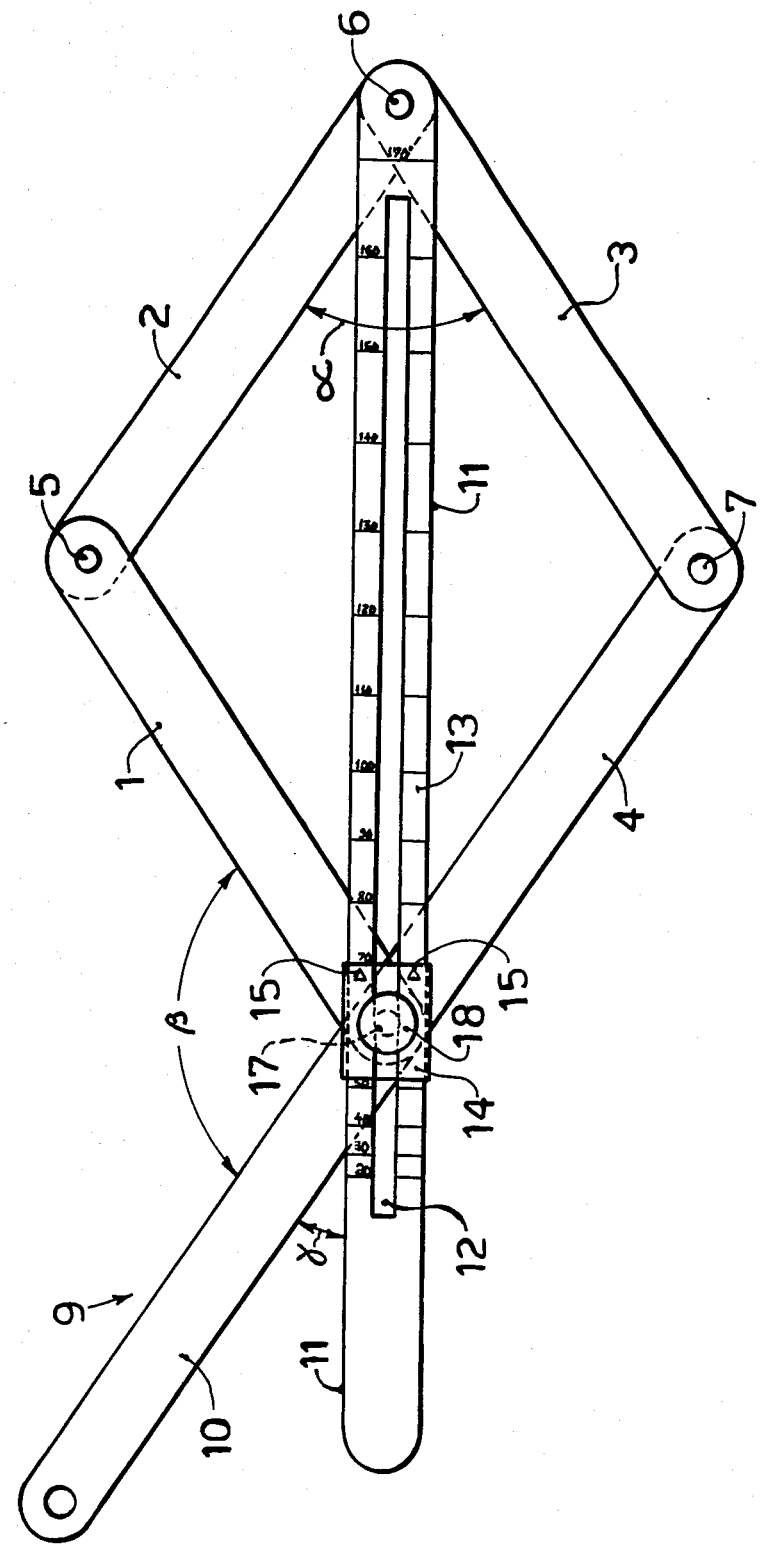
FIG. 2 is a plan view corresponding to FIG. 1 and illustrating the angle determinator in a different position.

The principal parts of the angle determinator according to the invention are four links 1, 2, 3, 4, which are hingedly connected to each other and in the preferred embodiment have equal length so that each link constitutes a side of a rhomb.

The pivot pins, by means of which the links 1-2, 2-3 and 3-4 are interconnected with each other, are suitably comprised of rivets 5, 6 and 7, respectively.

In the preferred embodiment the link 4 is comprised of a portion of a longer, substantially straight rod or the like which is generally designated 9 and whose free, extended portion supplementing the link 4 is designated 10.

On the pivot pin 6 between the link 2 and 3 a rod 11 is rotatably secured which is considerably longer than the links 1-4. Along part of the central, longitudinal axis of the bar 11 there extends a slot 12 which is formed in the bar 11. Along said slot and in the area belonging thereto the bar 11 is provided with a scale 13 suitably graduated in degrees (°). Within the area of the slot 12 and the scale 13 a slide 14 is displaceable. This slide has one edge 15 constituting an index or a pointer cooperating with the scale 13. A screw 17 having an enlarged head 18 serving as a knob or finger grip projects through an aperture in the slide 14, through the slot 12 of the bar 11 and that end of the link 4 which is connected to the link 1, and is with its end remote from the head 18 threaded into a threaded bore in the lowermost link 1. It is obvious that the screw 17 having its head 18 engaging the slide 14 with its underside, constitutes a pivot axis similar to the rivets 5-7 and that one after an arbitrary setting of the pointer 15 can lock the slide 14 in its set position.

Figure 3:
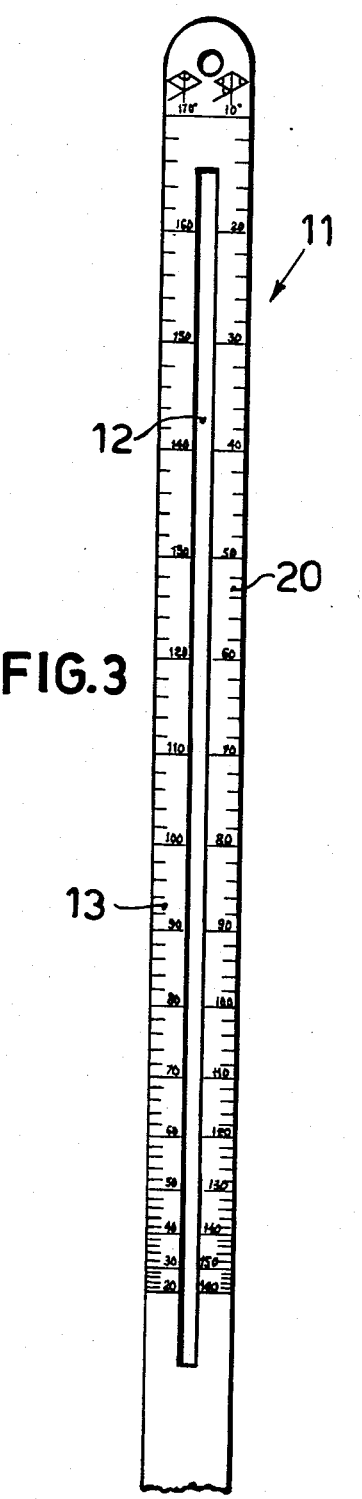
FIG. 3 is a partial plan view of a bar in the angle determinator and being provided with two different scales.
Figure 4:
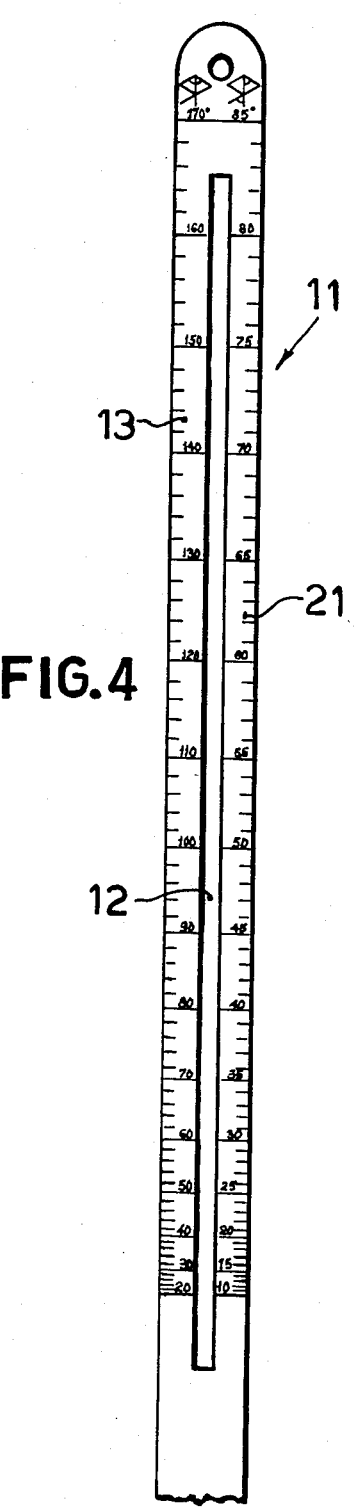
FIG. 4 is a partial plan view of a modification of the bar according to FIG. 3.

The scale 13 is suitably so constructed as to define the magnitude of the existing angle $\alpha$ between the links 2 and 3 and may possibly be supplemented with a second scale 20 defining the magnitude of the angle $\beta$ ($=180-\alpha$) between the rod 9 and the link 1, as illustrated in FIG. 3, or alternatively the angle $\gamma$ ($=\alpha/2$) between the rod 9 and the free end of the bar 11, as illustrated in FIG. 4.

When measuring a concave angle by means of the angle determinator according to the invention one initially loosens the screw 17, after which the links 2 and 3 are brought into complete engagement with the two planes defining the angle, the angle determinator being hereby maintained in a plane which is perpendicular to said two planes. Subsequently the screw 17 is tightened and the number of degrees indicated by the pointer 15 on the scale 13 is determined.

When measuring a convex angle one proceeds basically in the same way utilizing the free end portion 10 of the rod 9 and the link 1 (angle $\beta$) or alternatively the free portion of the bar 11 (angle $\gamma$).

The slot 12 is preferably designed as a rule or guide for a pencil or another drawing instrument which when displaced or moved along the slot draws the bisector of the angle $\alpha$ on a base or support located under the angle determinator, e.g. the end of a circular pole or the like. It is thus possible to determine the centre line of said pole with the aid of the angle determinator according to the invention by applying the inside of the links 2 and 3 against the circumference of the pole and then draw the bisector in the manner described above, the angle determinator being then rotated in the circumferential direction to a new angular position in which a new bisector is drawn. The point of intersection between the bisectors is located on the centre line of the pole or log.

The angle determinator according to the invention is primarily intended for the building and shipyard industry and for sheet-metal workers and may to advantage also be utilized in industrial schools and for craft and hobby activities. The angle determinator may also be utilized as a setsquare if the slide is set and locked to 90°, the bar 10 and the link 1 forming a straight angle with each other in this position.

The embodiments described above and illustrated in the drawings are, of course, to be regarded merely as non-limiting examples and may as to their details be modified in several ways within the scope of the following claims. Thus, the means for displacing the links 1, 4 along the bar 11 may be designed in another way.

What I claim is:

1. An angle determinator comprising four hingedly interconnected links, said links forming together a parallelogram having corners or apexes constructed as pivot joints, a bar-like member turnably connected to said parallelogram at a first one of its apexes, at least one scale provided on and extending along part of said bar-like member, and a pointer or index provided at that one of the apexes of the parallelogram which is opposite to said first apex, said pointer cooperating with said scale and being displaceable along the scale together with said opposite apex of the parallelogram, wherein one of the links forming the angle of the parallelogram at said opposite apex constitutes an integral portion of a substantially straight rod-like member forming together with said bar an angle which is half as wide as the angle of the parallelogram at said first apex.

2. An angle determinator according to claim 1, characterized by the provision of a scale, which is graduated in such a way that the pointer defines the width or magnitude of the angle of the parallelogram at said first apex of the parallelogram.

3. An angle determinator according to claim 1, characterized by the provision of a scale, which is graduated in such a way that the pointer defines the width or magnitude of the angle between the free end portion of the rod-like member and the other link extending from said opposite apex.

4. An angle determinator according to claim 1, characterized by the provision of a scale, which is graduated in such a way that the pointer defines the width or magnitude of the angle between the respective free end portions of the bar-like member and the rod-like member.

* * * * *